United States Patent Office 3,079,449
Patented Feb. 26, 1963

3,079,449
SEPARATION OF HYDROCARBON MIXTURES WITH 5-PROPIONOXYMETHYL FURFURAL SELECTIVE SOLVENT
Arthur C. Cope, Belmont, Mass., assignor to Merck & Co., Inc., Rahway, N.J., a corporation of New Jersey
No Drawing. Filed Apr. 18, 1961, Ser. No. 103,718
4 Claims. (Cl. 260—674)

This application is a continuation-in-part of our pending application, Serial number 759,134, filed September 5, 1958, now abandoned.

This invention relates to the solvent treatment of liquid mixtures of hydrocarbon products.

In addition, this invention provides the new compound 5-propionoxymethyl furfural and a process for producing this compound.

The invention also provides a simple, straightforward and efficient process for forming the new compound from readily available and inexpensive materials. The new compound 5-propionoxymethyl furfural is a liquid at ordinary temperatures and has interesting solvent properties making it specially advantageous for use as a selective solvent for organic compounds.

The invention is applicable to increase, readily and simply, the proportion of one of the constituents of a mixture of hydrocarbons in relation to the other constituent or constituents. It is particularly useful (i) to increase the aromatic hydrocarbon content of natural and straight run gasolines, (ii) to obtain aromatic hydrocarbons of high purity in high yield and (iii) to strip gasolines and kerosenes of aromatic hydrocarbons.

In accordance with a process of the present invention, aromatic constituents are separated from liquid hydrocarbon products by contacting said liquid hydrocarbon products with 5-propionoxymethyl furfural. This is a liquid boiling at 81° C. at 0.09 mm. pressure.

In accordance with another process of this invention, the new compound may be prepared by reacting propionic anhydride with either 5-hydroxymethyl furfural or with D-fructose.

In an embodiment of this invention, an excess of propionic anhydride is mixed with 5-hydroxymethyl furfural. It is preferable to have an acidic catalyst present, such as p-toluene sulfonic acid. The mixture is stirred and heated for 10 to 20 hours or for a shorter period of time if a catalyst is present. The reaction mass is then added to water, and the resulting mixture is extracted with diethyl ether. The ether extract is then separated and fractionally distilled. The diethyl ether is collected initially. The residual 5-propionoxymethyl furfural is then distilled under reduced pressure.

In another embodiment of this invention 5-propionoxymethyl furfural is intimately mixed with a liquid mixture of hydrocarbon products which mixture can be either:

A. An aromatic compound and an aliphatic compound
B. A conjugated diene and an alkene
C. An aromatic compound and a naphthenic compound An initial mixture containing 5-propionoxymethyl furfural and compounds of either group A, group B or group C is formed.

Each initial mixture is stirred in a vessel which is preferably maintained at a constant temperature. After 30 minutes' agitation is ceased and the mixture allowed to stand. The lower solvent or extract layer separates. The upper raffinate layer is decanted. The composition of each layer is determined by separation of the hydrocarbons from the solvent, as by distillation, and by measurement of the refractive index of the mixed hydrocarbons.

The extract phase contains either aromatic compounds, or conjugated dienes. The raffinate contains either aliphatic or naphthenic compounds.

It is preferable to repeat the extraction of the raffinate with 5-propionoxymethyl furfural. The operation is repeated preferably from 1 up to about 10 times depending upon (i) the volume ratio of 5-propionoxymethyl furfural to hydrocarbon (ii) the volume ratio of the hydrocarbon compounds in the initial mixture and other variables known in the art.

The raffinate and extract are then separately distilled giving separate mixtures each having some hydrocarbon in a proportion greater than those in the original mixture.

After the distillation of the extract and the raffinate, the residues are combined and degassed at reduced pressure. The resulting 5-propionoxymethyl furfural may then be resused as a selective solvent.

Alternately, the extraction operation may be carried out in a continuous manner using an extraction column. The raffinate phase and extract phase are fed continuously into separate stills wherein lower boiling compounds are stripped from the 5-propionoxymethyl furfural continuously. From the still the 5-propionoxymethyl furfural containing traces of dissolved hydrocarbons are continuously fed into a degassing vessel which is under reduced pressure. In this vessel, the 5-propionoxymethyl furfural is degassed under such a pressure and at such a temperature that there is no chance of decomposition.

The following examples are given primarily by way of illustration and not of limitation.

Example 1, following, illustrates the carrying out of a process of the invention for production of the compound, 5-propionoxymethyl furfural.

EXAMPLE I

A mixture of 4.0 g. of 5-hydroxymethyl furfural and 4.1 g. of propionic anhydride is heated on a steam cone for 15 hours. The mixture is poured into water and the product extracted with ether. Fractionation of the ethereal extract affords 3.7 g. (66%) of 5-propionoxymethyl furfural, B.P. 81° C. (0.09 mm.), $n_D^{25}$ 1.5104, $d_4^{25}$ 1.185.

*Analysis.*—Calcd. for $C_9H_{10}O_4$: C, 59.36; H, 5.53. Found: C, 59.55; H, 5.46.

5 - propionoxymethyl furfural semicarbazone melts at 183.2–183.8° C., after three recrystallizations from aqueous ethanol.

*Analysis.*—Calcd. for $C_{10}H_{14}O_4N_3$: C, 50.00; H, 5.88; N, 17.49. Found: C, 49.85; H, 5.63; N, 17.62.

The operation carried out in Example I may be modified by reatcing the HMF with propionic acid in the presence of a small amount of a strong acid catalyst, such as sulfuric acid, toluenesulfonic acid, or boron trifluoride.

Example II, following, illustrates the process of producing the compound 5-propionoxymethyl furfural from the sugar, D-frutose.

EXAMPLE II

D-fructose (20 g.), 14.3 g. of propionic anhydride and 97 g. of propionic acid are heated under reflux for 0.5 hour. The soluiton is cooled, poured into water, neutralized and extracted with ether. Fractionation of the ethereal extract affords 2.5 g. (13%) of 5-propionoxymethyl furfural, identified by melting point and mixed melting point of the semicarbazone with the sample described above.

EXAMPLE III

Three initial mixtures shown as A, B and C in Table I, below, containing various proportions of toluene, methyl cyclohexane and 5-propionoxymethyl furfural are prepared. Each initial mixture is stirred in a vessel and is maintained at a constant temperature of 20° C.

After one-half hour the stirrer is stopped and the mixture is allowed to stand. The lower solvent or extract layer separates rapidly. The upper raffinate layer is decanted. The composition of each layer is determined by distillation of the hydrocarbons away from the solvent and by the refractive index of the mixed hydrocarbons. The compositions of each of the three initial mixtures, and the compositions of the respective extract layers and raffinate layers are given in Table I, below. Each column shows the composition of one of the three initial mixtures and the compositions of its respective extract and raffinate layers.

Table I

|  | Percent by Weight | | |
| --- | --- | --- | --- |
|  | A | B | C |
| Original Mixture: | | | |
| Toluene | 6.4 | 21.0 | 33.0 |
| Methyl Cyclohexane | 33.6 | 19.0 | 27.0 |
| 5-Propionoxymethyl furfural | 60.0 | 60.0 | 40.0 |
| Extract Layer: | | | |
| Toluene | 2.9 | 20.5 | 30.5 |
| Methyl Cyclohexane | 9.6 | 15.4 | 22.2 |
| 5-Propionoxymethyl furfural | 87.5 | 64.1 | 47.3 |
| Raffinate Layer: | | | |
| Toluene | 14.1 | 29.5 | 44.2 |
| Methyl Cyclohexane | 83.7 | 67.0 | 50.9 |
| 5-Propionoxymethyl furfural | 2.2 | 3.5 | 4.9 |

EXAMPLE IV

Three initial mixtures shown as D, E and F in Table II, below, containing various proportions of isoprene, n-octene-1 and 5-propionoxymethyl furfural are prepared. Each initial mixture is stirred in a vessel and is maintained at a constant temperature of 20° C. After one-half hour the stirrer is stopped and the mixture allowed to stand. The lower solvent or extract layer separates rapidly. The upper raffinate layer is decanted. The composition of each layer is determined by distillation of the hydrocarbons away from the solvent and by the refractive index of the mixed hydrocarbons. The compositions of each of the three initial mixtures, and the compositions of the respective extract layers and raffinate layers are given in Table II, below. Each column shows the composition of one of the three initial mixtures and the compositions of its respective extract and raffinate layers.

Table II

|  | Percent by Weight | | |
| --- | --- | --- | --- |
|  | D | E | F |
| Original Mixture: | | | |
| Isoprene | 10.2 | 25.0 | 47.3 |
| n-Octene-1 | 29.8 | 25.0 | 12.7 |
| 5-Propionoxymethyl furfural | 60.0 | 50.0 | 40.0 |
| Extract Layer: | | | |
| Isoprene | 10.3 | 15.7 | 37.9 |
| n-Octene-1 | 3.8 | 4.0 | 4.7 |
| 5-Propionoxymethyl furfural | 85.9 | 80.3 | 57.4 |
| Raffinate Layer: | | | |
| Isoprene | 10.0 | 39.8 | 67.0 |
| n-Octene-1 | 89.0 | 58.0 | 29.4 |
| 5-Propionoxymethyl furfural | 1.0 | 2.2 | 3.6 |

EXAMPLE V

Three initial mixtures shown as G, H and J in Table III, below, containing various proportions of benzene, n-hexane and 5-propionoxymethyl furfural are prepared. Each initial mixture is stirred in a vessel and is maintained at a constant temperature of 20° C. After one-half hour the stirrer is stopped and the mixture is allowed to stand. The lower solvent or extract layer separates rapidly. The upper raffinate layer is decanted. The composition of each layer is determined by distillation of the hydrocarbons away from the solvent and by the refractive index of the mixed hydrocarbons. The compositions of each of the three initial mixtures, and the compositions of the respective extract layers and raffinate layers are given in Table III, below. Each column shows the composition of one of the three initial mixtures and the compositions of its respective extract and raffinate layers.

Table III

|  | Percent by Weight | | |
| --- | --- | --- | --- |
|  | G | H | J |
| Original Mixture: | | | |
| Benzene | 5.9 | 13.3 | 19.3 |
| n-Hexane | 34.1 | 36.7 | 40.7 |
| 5-Propionoxymethyl furfural | 60.0 | 50.0 | 40.0 |
| Extract Layer: | | | |
| Benzene | 2.9 | 7.1 | 9.7 |
| n-Hexane | 4.3 | 5.7 | 6.7 |
| 5-Propionoxymethyl furfural | 92.8 | 87.2 | 83.6 |
| Raffinate Layer: | | | |
| Benzene | 11.3 | 21.0 | 27.3 |
| n-Hexane | 86.8 | 76.0 | 68.9 |
| 5-Propionoxymethyl furfural | 1.9 | 3.0 | 3.8 |

From this data given in Tables I, II, and III it is possible to calculate the number of stages necessary to effect a desired separation of the components in the system illustrated.

Various changes and modifications may be made in carrying out the present invention without departure from the spirit and scope thereof. Insofar as these changes and modifications are within the purview of the annexed claims they are to be considered as part of this invention.

What is claimed is:

1. A process for treating a liquid mixture of hydrocarbon products selected from the mixtures consisting of (i) an aromatic compound and an aliphatic compound (ii) a conjugated diene and an alkene, and (iii) an aromatic compound from a naphthenic compound, which comprises contacting said liquid mixture with 5 - propionoxymethyl furfural, allowing the resulting mixture to separate into an extract phase and a raffinate phase, separating the two phases, and removing the 5-propionoxymethyl furfural from each phase thereby obtaining in the extract phase a liquid hydrocarbon mixture in which the first named component is in higher proportion than is contained in the original material, and in the raffinate phase a liquid hydrocarbon mixture in which the second named component is in higher proportion than is contained in the original material.

2. A process for separating toluene and methylcyclohexane from a mixture thereof which comprises contacting said mixture with 5-propionoxymethyl furfural to form extract and raffinate layers and recovering the major portion of the toluene from the extract layer, and the major portion of the methyl cyclohexane from the raffinate layer.

3. A process for separating isoprene and n-octene-1 from a mixture thereof which process comprises contacting said mixture with 5-propionoxymethyl furfural to form extract and raffinate layers, and recovering the major portion of the n-octene-1 from the raffinate layer, and the major portion of the isoprene from the extract layer.

4. A process for separating benzene and n-hexane from a mixture thereof which process comprises contacting said mixture with 5-propionoxymethyl furfural to form extract and raffinate layers and recovering the major portion of the benzene from the extract layer and the major portion of the n-hexane from the raffinate layer.

No references cited.